United States Patent [19]
Cho

[11] Patent Number: 5,495,451
[45] Date of Patent: Feb. 27, 1996

[54] APPARATUS FOR DETECTING DATA INPUT/OUTPUT STATES OF A PLURALITY OF FIRST-IN FIRST-OUT MEMORIES

[75] Inventor: Sung K. Cho, Seoul, Rep. of Korea

[73] Assignee: Goldstar Electron Co., Ltd., Choongchungbook-do, Rep. of Korea

[21] Appl. No.: 367,607

[22] Filed: Jan. 3, 1995

[30] Foreign Application Priority Data

May 17, 1994 [KR] Rep. of Korea ............... 10841/1994

[51] Int. Cl.$^6$ .................................. G11C 7/00
[52] U.S. Cl. ............... 365/221; 365/189.07; 365/236; 365/189.02
[58] Field of Search .................... 365/221, 236, 365/189.02, 189.07, 189.01, 230.03

[56] References Cited

U.S. PATENT DOCUMENTS

| | | | |
|---|---|---|---|
| 5,206,817 | 4/1993 | McClure | 365/189.01 |
| 5,228,002 | 7/1993 | Huang | 365/221 |
| 5,375,092 | 12/1994 | Taniguchi et al. | 365/221 |
| 5,426,612 | 6/1995 | Ichige et al. | 365/221 |

Primary Examiner—Tan T. Nguyen
Attorney, Agent, or Firm—Lowe, Price LeBlanc & Becker

[57] ABSTRACT

An apparatus for detecting data input/output states of a plurality of FIFO memories, comprising a control signal generator for logically combining a load clock signal, a read clock signal, a write clock signal and a reset signal to generate a clock signal and a mode signal, a clock counting circuit for performing a counting operation for the read clock signal and the write clock signal in response to the clock signal and the mode signal from the control signal generator to generate a count signal, a fullness level value storage unit for storing a plurality of fullness level values, a multiplexer for selecting one of the fullness level values from the fullness level value storage unit in response to a select signal, a signal comparator for comparing an output signal from the multiplexer with the count signal from the clock counting circuit to discriminate whether it is the same as the count signal, a demultiplexer for generating a plurality of status signals in response to an output signal from the signal comparator and the select signal, the status signals being indicative of a fullness level value regarding the number of data currently stored in the corresponding FIFO memory, and a flag generator for generating a plurality of flag signals in response to the status signals from the demultiplexer.

12 Claims, 9 Drawing Sheets

| SN | RN | Q | QN |
|----|----|----|----|
| 0 | 0 | 1 | 1 |
| 0 | 1 | 1 | 0 |
| 1 | 0 | 0 | 1 |
| 1 | 1 | Q | QN |

APPARATUS FOR DETECTING DATA INPUT/OUTPUT STATES OF A PLURALITY OF FIRST-IN FIRST-OUT MEMORIES

BACKGROUND OF THE INVENTION

1. Field of the Invention

The present invention relates in general to the detection of data input/output states of a first-in first-out (referred to hereinafter as FIFO) memory, and more particularly to a data input/output state detection apparatus which is applicable to a plurality of FIFO memories, detects the data input/output states more accurately and is simple in the construction.

2. Description of the Prior Art

Referring to FIG. 1, there is shown a block diagram of a conventional apparatus for detecting data input/output states of an FIFO memory. As shown in this drawing, the conventional data input/output state detection apparatus comprises a write counter 101 for performing a counting operation for a write clock signal WC and a write clock bar signal WCB in response to a write reset signal WR and outputting the resultant count values WQ and WQN, a read counter 102 for performing a counting operation for a read clock signal RC and a read clock bar signal RCB in response to a read reset signal RR and outputting the resultant count values RQ and RQN, a first subtracter 103 for inputting the count value RQN from the read counter 102 and the count value WQ from the write counter 101, subtracting the inputted count value RQN from the inputted count value WQ and outputting the resultant value, comparators 105–107 for comparing an output value from the first subtracter 103 with predetermined values PHF, PAF and PF and outputting the resultant signals, respectively, a clock generator 115 for generating a clock signal in response to the write clock signal WC, the write reset signal WR, the read clock bar signal RCB and the read reset signal RR and outputting the generated clock signal, and flip-flops 110–112 for latching output signals from the comparators 105–107 in response to the clock signal from the clock generator 115 and outputting the latched signals as flag signals HFF, AFF and FF, respectively.

The conventional data input/output state detection apparatus also comprises a second subtracter 104 for inputting the count value RQ from the read counter 102 and the count value WQN from the write counter 101, subtracting the inputted count value RQ from the inputted count value WQN and outputting the resultant value, comparators 108 and 109 for comparing an output value from the second subtracter 104 with predetermined values PE and PAE and outputting the resultant signals, respectively, a clock generator 116 for generating a clock signal in response to the write clock bar signal WCB, the write reset signal WR, the read clock signal RC and the read reset signal RR and outputting the generated clock signal, and flip-flops 113 and 114 for latching output signals from the comparators 108 and 109 in response to the clock signal from the clock generator 116 and outputting the resultant logic signals, respectively.

Further, the conventional data input/output state detection apparatus comprises an inverter 117 for inverting the logic signal from the flip-flop 113 and outputting the resultant flag signal EF, and an inverter 118 for inverting the logic signal from the flip-flop 114 and outputting the resultant flag signal AEF.

The operation of the conventional data input/output state detection apparatus with the above-mentioned construction will hereinafter be described.

At an initial state of an FIFO memory system, the write and read counters 101 and 102 are initialized in response to the write and read reset signals WR and RR, respectively.

Thereafter, when data input or write and output or read operations are performed by the FIFO memory, the write clock signal WC and the write clock bar signal WCB are applied for the data write operation of the FIFO memory. The count value of the write counter 101 is incremented by one whenever each of the write clock signal WC and the write clock bar signal WCB is applied. The count value of the write counter 101 indicates the number of data written into the FIFO memory up to now. Also, the read clock signal RC and the read clock bar signal RCB are applied for the data read operation of the FIFO memory. The count value of the read counter 102 is incremented by one whenever each of the read clock signal RC and the read clock bar signal RCB is applied. The count value of the read counter 102 indicates the number of data read from the FIFO memory up to now.

The write counter 101 outputs the two count values WQ and WQN, the former being varied at a rising edge of the write clock signal WC and the latter being varied at a falling edge of the write clock bar signal WCB. Similarly, the read counter 102 outputs the two count values RQ and RQN, the former being varied at a rising edge of the read clock signal RC and the latter being varied at a falling edge of the read clock bar signal RCB.

Then, the first subtracter 103 obtains a difference WQ-RQN between the count value RQN from the read counter 102 and the count value WQ from the write counter 101. The difference WQ-RQN from the first subtracter 103 indicates the number of data remaining in the FIFO memory at a time point that the write operation of the FIFO memory is started after the read operation thereof is ended.

The comparator 107 compares the output value from the first subtracter 103 with the predetermined value PF to discriminate whether it is smaller than the predetermined value PF. As a result of the comparison, the comparator 107 outputs a logic signal to the flip-flop 112. The flip-flop 112 latches the logic signal from the comparator 107 and then outputs the latched logic signal as the flag signal FF.

The comparator 106 compares the output value from the first subtracter 103 with the predetermined value PAF to discriminate whether it is smaller than the predetermined value PAF. As a result of the comparison, the comparator 106 outputs a logic signal to the flip-flop 111. The flip-flop 111 latches the logic signal from the comparator 106 and then outputs the latched logic signal as the flag signal AFF. Also, the comparator 105 compares the output value from the first subtracter 103 with the predetermined value PHF to discriminate whether it is smaller than the predetermined value PHF. As a result of the comparison, the comparator 105 outputs a logic signal to the flip-flop 110. The flip-flop 110 latches the logic signal from the comparator 105 and then outputs the latched logic signal as the flag signal HFF.

At this time, the clock generator 115, as a deglitch circuit, generates a clock pulse after a desired delay time in such a manner that the flip-flops 110–112 can latch the output signals from the comparators 105–107 at a proper time.

Here, the comparator 105 is a half full comparison block, the comparator 106 is an almost full comparison block and the comparator 107 is a full comparison block.

On the other hand, the second subtracter 104 obtains a difference WQN-RQ between the count value RQ from the read counter 102 and the count value WQN from the write counter 101. The difference WQN-RQ from the second subtracter 104 indicates the number of data remaining in the FIFO memory at a time point that the read operation of the FIFO memory is started after the write operation thereof is ended.

Then, the comparator 109 compares the output value from the second subtracter 104 with the predetermined value PAE to discriminate whether it is smaller than the predetermined value PAE. As a result of the comparison, the comparator 109 outputs a logic signal to the flip-flop 114. The flip-flop 114 latches the logic signal from the comparator 109 and outputs the latched logic signal to the inverter 118. The output signal from the flip-flop 114 is inverted by the inverter 118 and then outputted as the flag signal AEF.

The comparator 108 compares the output value from the second subtracter 104 with the predetermined value PE to discriminate whether it is smaller than the predetermined value PE. As a result of the comparison, the comparator 108 outputs a logic signal to the flip-flop 113. The flip-flop 113 latches the logic signal from the comparator 108 and outputs the latched logic signal to the inverter 117. The output signal from the flip-flop 113 is inverted by the inverter 117 and then outputted as the flag signal EF.

At this time, the clock generator 116, as a deglitch circuit, generates a clock pulse after a desired delay time in such a manner that the flip-flops 113 and 114 can latch the output signals from the comparators 108 and 109 at a proper time.

Here, the comparator 108 is an empty comparison block and the comparator 109 is an almost empty comparison block.

However, the above-mentioned conventional data input/output state detection apparatus has a disadvantage in that it cannot detect the data input/output states of a plurality of FIFO memories. Also, the comparators are provided correspondingly to respective fullness levels. For this reason, as the fullness levels are increased in number, the comparators are increased in number. The increase in the number of the comparators makes the circuit construction complex and an intentional increase in the number of the fullness levels difficult. Further, the fullness levels cannot be varied in operation, so that the data input/output states of the FIFO memory cannot be detected accurately. Moreover, the use of the deglitch circuits may result in a faulty operation in an actual manufacturing process.

SUMMARY OF THE INVENTION

Therefore, the present invention has been made in view of the above problems, and it is an object of the present invention to provide an apparatus for detecting data input/output states of a plurality of FIFO memories in which the number of data stored in a corresponding one of the plurality of FIFO memories is set to an initial value, the number of the stored data is then compared with fullness level values, each of which indicates the number of data storable at the maximum in a corresponding one of a plurality of levels of the corresponding FIFO memory, and a flag indicative of a current fullness level value is generated in accordance with the compared results.

In accordance with the present invention, the above and other objects can be accomplished by a provision of an apparatus for detecting data input/output states of a plurality of first-in first-out memories, comprising control signal generation means for logically combining a load clock signal, a read clock signal, a write clock signal and a reset signal to generate a clock signal and a mode signal; clock counting means for performing a counting operation for the read clock signal and the write clock signal in response to the clock signal and the mode signal from said control signal generation means to generate a count signal indicative of the number of data currently stored in a corresponding one of the first-in first-out memories; fullness level value storage means for storing a plurality of fullness level values, each of the fullness level values being indicative of the number of data storable at the maximum in a corresponding one of a plurality of levels of the corresponding first-in first-out memory; multiplexing means for selecting one of the fullness level values from said fullness level value storage means in response to a select signal; signal comparison means for comparing an output signal from said multiplexing means with the count signal from said clock counting means to discriminate whether it is the same as the count signal; demultiplexing means for generating a plurality of status signals in response to an output signal from said signal comparison means and the select signal, the status signals being indicative of a fullness level value regarding the number of data currently stored in the corresponding first-in first-out memory; and flag generation means for generating a plurality of flag signals in response to the status signals from said demultiplexing means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
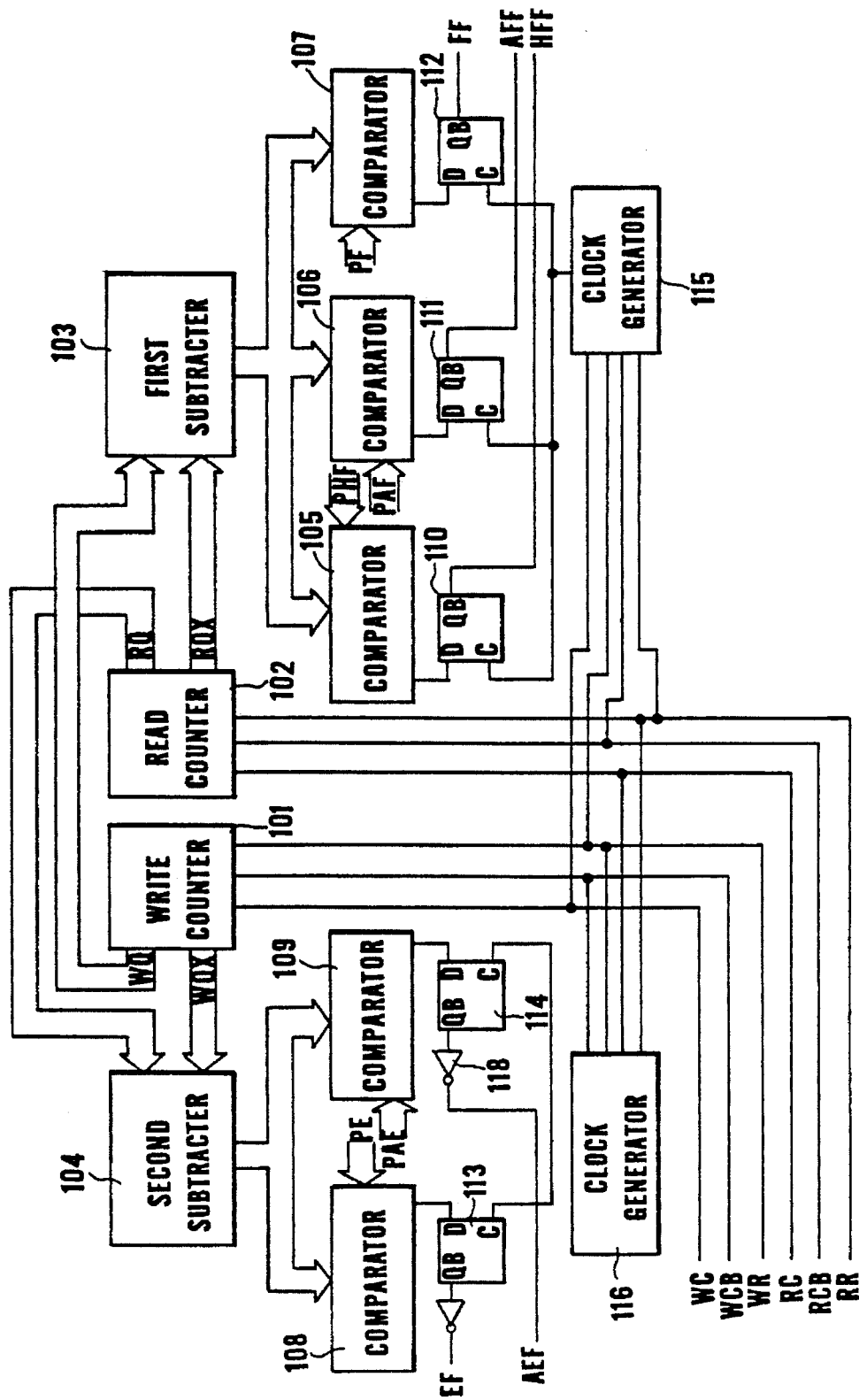
FIG. 1 is a block diagram of a conventional apparatus for detecting data input/output states of an FIFO memory.
Figure 2:
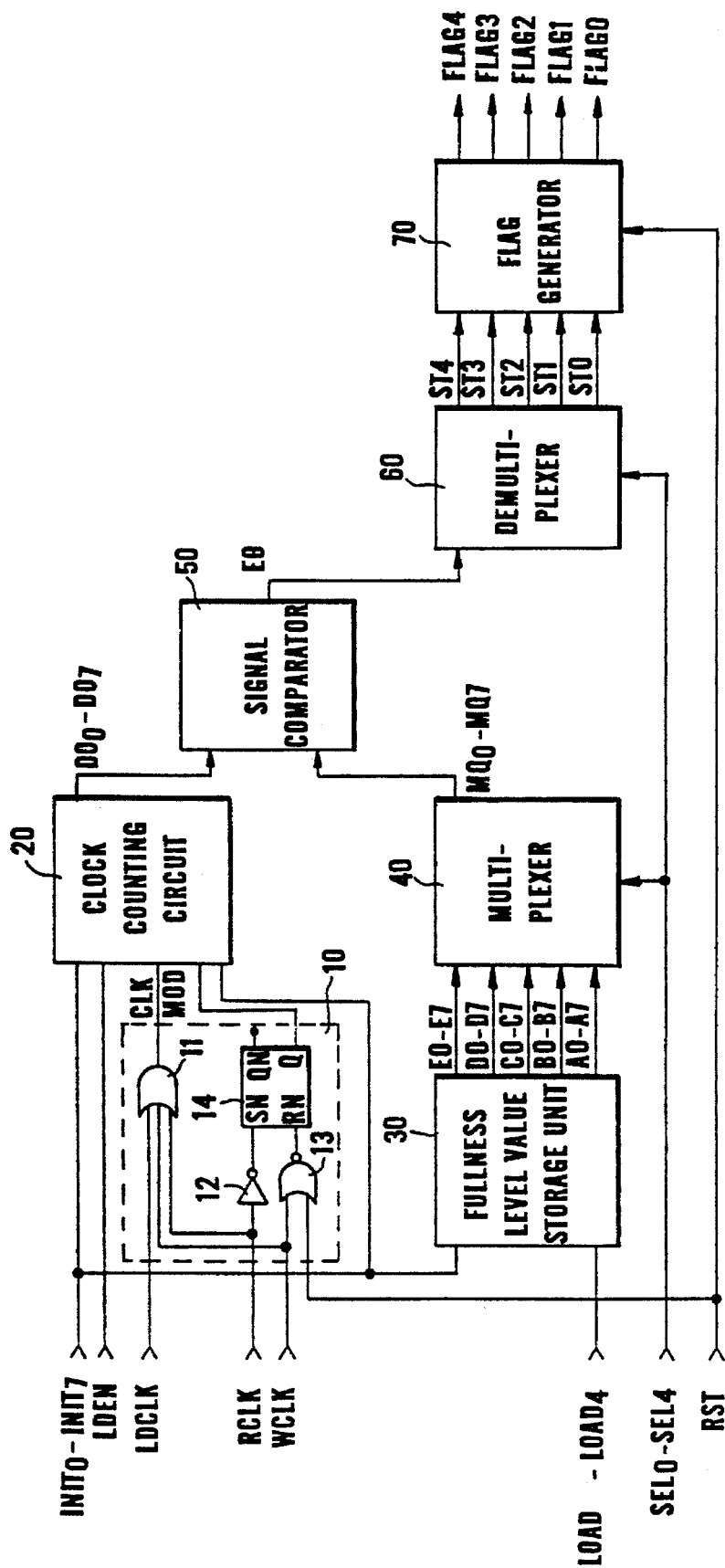
FIG. 2 is a block diagram of an apparatus for detecting data input/output states of a plurality of FIFO memories in accordance with the present invention.

Referring to FIG. 2, there is shown a block diagram of an apparatus for detecting data input/output states of a plurality of FIFO memories in accordance with the present invention. As shown in this drawing, the data input/output state detection apparatus comprises a control signal generator 10 for logically combining a load clock signal LDCLK, a read clock signal RCLK, a write clock signal WCLK and a reset signal RST to generate a clock signal CLK and a mode signal MOD, a clock counting circuit 20 for inputting an initial value INIT0–INIT7 in response to a load enable signal LDEN and performing an up or down counting operation for the read clock signal RCLK and the write clock signal WCLK in response to the reset signal RST and the clock signal CLK and the mode signal MOD from the control signal generator 10 to generate a count signal DQ0–DQ7, and a fullness level value storage unit 30 for storing the initial value INIT0–INIT7 in response to a load signal LOAD0–LOAD4 and outputting fullness level values A0–A7, B0–B7, C0–C7, D0–D7 and E0–E7. The count signal DQ0–DQ7 from the clock counting circuit 20 indicates the number of data currently stored in a corresponding one of the plurality of FIFO memories. Each of the fullness level values A0–A7, B0–B7, C0–C7, D0–D7 and E0–E7 from the fullness level value storage unit 30 indicates the number of data storable at the maximum in a corresponding one of a plurality of levels of the corresponding FIFO memory.

Further, the data input/output state detection apparatus comprises a multiplexer 40 for selecting one of the fullness level values A0–A7, B0–B7, C0–C7, D0–D7 and E0–E7 from the fullness level value storage unit 30 in response to a select signal SEL0–SEL4, a signal comparator 50 for comparing an output signal MQ0-14 MQ7 from the multiplexer 40 with the count signal DQ0–DQ7 from the clock counting circuit 20 to discriminate whether it is the same as the count signal DQ0–DQ7, a demultiplexer 60 for generating a plurality of status signals ST0–ST4 in response to an output signal EQ from the signal comparator 50 and the select signal SEL0–SEL, and a flag generator 70 for generating a plurality of flag signals FLAG0–FLAG4 in response to the status signals ST0–ST4 from the demultiplexer 60. The status signals ST0–ST4 from the demultiplexer 60 indicate a fullness level value regarding the number of data currently stored in the corresponding FIFO memory. The flag signals FLAG0–FLAG4 from the flag generator 70 indicate the data input/output states of the corresponding FIFO memory.

The control signal generator 10 includes an OR gate 11 for ORing the load clock signal LDCLK, the read clock signal RCLK and the write clock signal WCLK and outputting the resultant signal as the clock signal CLK to the clock counting circuit 20, an inverter 12 for inverting the read clock signal RCLK, a NOR gate 13 for NORing the reset signal RST and the write clock signal WCLK, and an S-R latch 14 for inputting an output signal from the inverter 12 at its set terminal SN and an output signal from the NOR gate 13 at its reset terminal RN and outputting the mode signal MOD to the clock counting circuit 20.

Figures 3A, 3B:
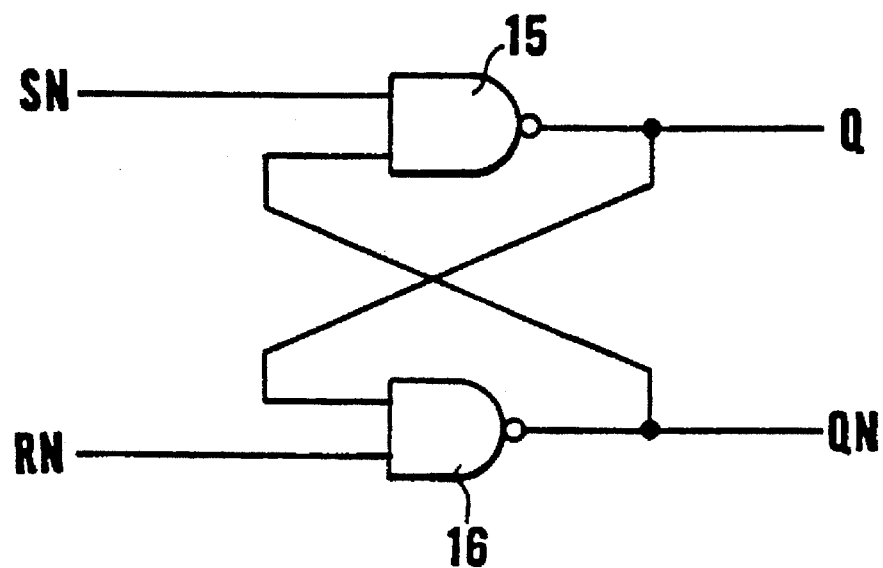
FIG. 3A is a detailed circuit diagram of an S-R latch in FIG. 2.
FIG. 3B is a truth table of the S-R latch in FIG. 3A.

Referring to FIG. 3A, there is shown a detailed circuit diagram of the S-R latch 14 in FIG. 2. As shown in this drawing, the S-R latch 14 includes two NAND gates 15 and 16. The NAND gate 15 inputs the output signal from the inverter 12 at the set terminal SN and an output signal QN from the NAND gate 16 and outputs a signal Q. The NAND gate 16 inputs the output signal Q from the NAND gate 15 and the output signal from the NOR gate 13 at the reset terminal RN and outputs the signal QN. The S-R latch 14 has truth values as shown in a truth table of FIG. 3B.

Figure 4:
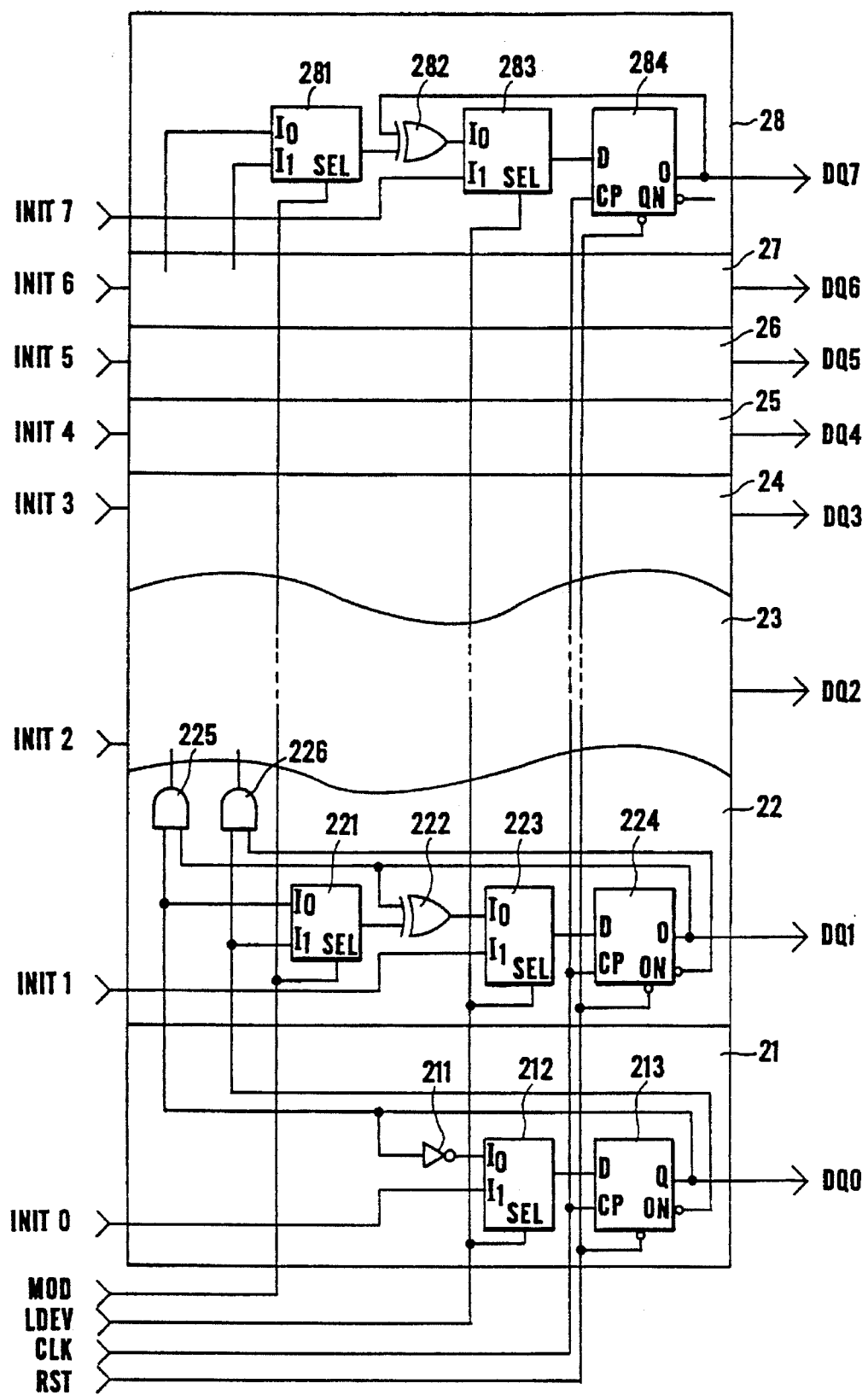
FIG. 4 is a detailed circuit diagram of a clock counting circuit in FIG. 2.

Referring to FIG. 4, there is shown a detailed circuit diagram of the clock counting circuit 20 in FIG. 2. As shown in this drawing, the clock counting circuit 20 includes first to eighth counting stages 21–28, each of which inputs the mode signal MOD and the clock signal CLK from the control signal generator 10, the load enable signal LDEN, the reset signal RST and a corresponding bit value of the initial value INIT0–INIT7 and outputs a corresponding bit value of the count signal DQ0–DQ7 to the signal comparator 50.

The first counting stage 21 includes an inverter 211 for inverting a first bit value DQ0 of the count signal DQ0–DQ7, a selector 212 for inputting an output signal from the inverter 211 at its one input terminal I0 and a first bit value INIT0 of the initial value INIT0–INIT7 at its other input terminal I1 and selecting one of the inputted signals in response to the load enable signal LDEN inputted at its select terminal SEL, and a D flip-flop 213 for latching an output signal from the selector 212 inputted at its input terminal D in response to the clock signal CLK from the control signal generator 10 inputted at its clock terminal CP and outputting the latched signal as the first bit value DQ0 of the count signal DQ0–DQ7 to the second counting stage 22 and the signal comparator 50 at its non-inverting output terminal Q. Also, the D flip-flop 213 outputs an inverted one of the first count signal bit value DQ0 to the second counting stage 22 at its inverting output terminal QN and resets the first count signal bit value DQ0 in response to the reset signal RST.

The second counting stage 22 includes a selector 221 for inputting the first count signal bit value DQ0 from the D flip-flop 213 in the first counting stage 21 at its one input terminal I0 and the inverted one of the first count signal bit value DQ0 from the D flip-flop 213 at its other input terminal I1 and selecting one of the inputted signals in response to the mode signal MOD from the control signal generator 10 inputted at its select terminal SEL, an exclusive OR gate 222 for exclusive-ORing an output signal from the selector 221 and a second bit value DQ1 of the count signal DQ0–DQ7, a selector 223 for inputting an output signal from the exclusive OR gate 222 at its one input terminal I0 and a second bit value INIT1 of the initial value INIT0–INIT7 at its other input terminal I1 and selecting one of the inputted signals in response to the load enable signal LDEN inputted at its select terminal SEL, and a D flip-flop 224 for latching an output signal from the selector 223 in response to the clock signal CLK from the control signal generator 10, outputting the latched signal as the second bit value DQ1 of the count signal DQ0–DQ7 to the signal comparator 50 and resetting the second count signal bit value DQ1 in response to the reset signal RST.

Further, the second counting stage 22 includes an AND gate 225 for ANDing the second count signal bit value DQ1 from the D flip-flop 224 and the first count signal bit value DQ0 from the D flip-flop 213 in the first counting stage 21 and outputting the resultant signal as a first output signal to the third counting stage 23, and an AND gate 226 for ANDing an inverted one of the second count signal bit value DQ1 from the D flip-flop 224 and the inverted one of the first count signal bit value DQ0 from the D flip-flop 213 and outputting the resultant signal as a second output signal to the third counting stage 23.

The third to seventh counting stages 23–27 are sequentially connected to the second counting stage 22 to output third to seventh bit values DQ2–DQ6 of the count signal DQ0–DQ7 corresponding to third to seventh bit values INIT2–INIT6 of the initial value INIT0–INIT7, respectively. Each of the third to seventh counting stages 23–27 has the same construction as that of the second counting stage 22 and a description thereof will thus be omitted.

The eighth counting stage 28 includes a selector 281 for selecting one of the first and second output signals from the seventh counting stage 27 in response to the mode signal MOD from the control signal generator 10, an exclusive OR gate 282 for exclusive-ORing an output signal from the selector 281 and an eighth bit value DQ7 of the count signal DQ0–DQ7, a selector 283 for selecting one of an output signal from the exclusive OR gate 282 and an eighth bit value INIT7 of the initial value INIT0–INIT7 in response to the load enable signal LDEN, and a D flip-flop 284 for latching an output signal from the selector 283 in response to the clock signal CLK from the control signal generator 10, outputting the latched signal as the eighth bit value DQ7 of the count signal DQ0–DQ7 to the signal comparator 50 and resetting the eighth count signal bit value DQ7 in response to the reset signal RST.

Figure 5:
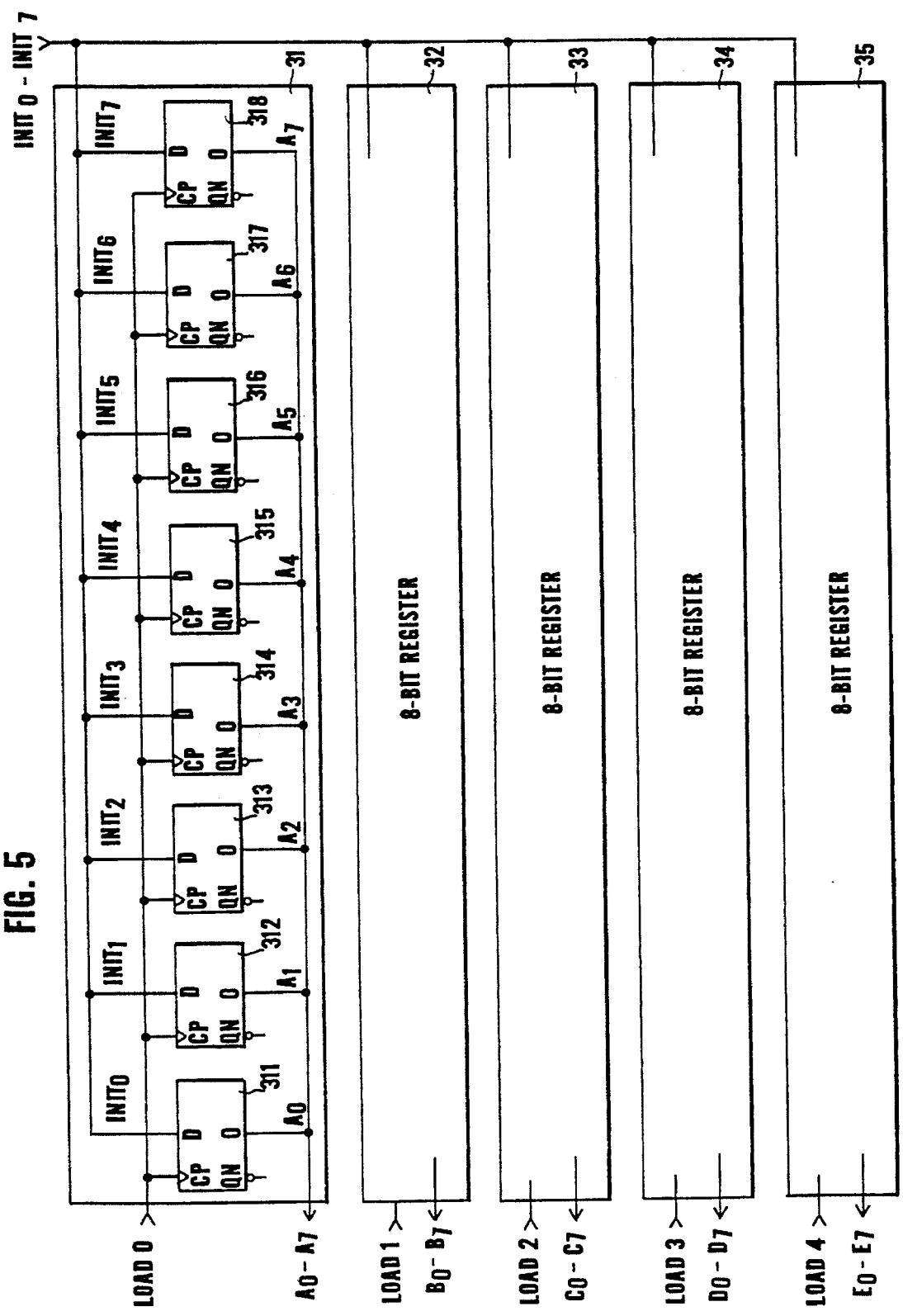
FIG. 5 is a detailed circuit diagram of a fullness level value storage unit in FIG. 2.

Referring to FIG. 5, there is shown a detailed circuit diagram of the fullness level value storage unit 30 in FIG. 2. As shown in this drawing, the fullness level value storage unit 30 includes first to fifth 8-bit registers 31–35, each of which stores the initial value INIT0–INIT7 in response to a corresponding bit value of the load signal LOAD0–LOAD4 and outputs a corresponding one of the fullness level values A0–A7, B0–B7, C0–C7, D0–D7 and E0–E7 to the multiplexer 40.

The first register 31 includes D flip-flops 311–318, each of which latches a corresponding bit value of the initial value INIT0–INIT7 in response to a first bit value LOAD0 of the load signal LOAD0–LOAD4 and outputs the latched value as a corresponding bit value of the fullness level value A0–A7 to the multiplexer 40.

Each of the second to fifth 8-bit registers 32–35 has the same construction as that of the first register 31 and a description thereof will thus be omitted.

Figure 6:
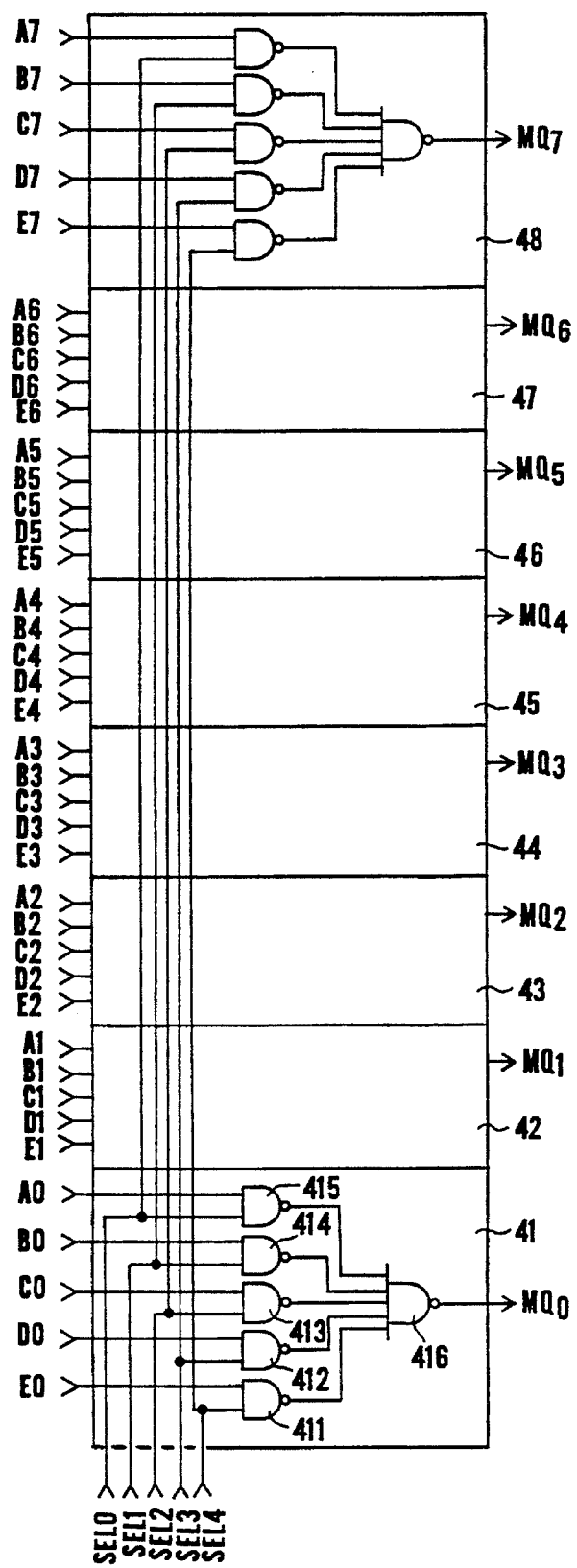
FIG. 6 is a detailed circuit diagram of a multiplexer in FIG. 2.

Referring to FIG. 6, there is shown a detailed circuit diagram of the multiplexer 40 in FIG. 2. As shown in this drawing, the multiplexer 40 includes first to eighth selection means 41–48, each of which selects one of corresponding bit values of the fullness level values A0–A7, B0–B7, C0–C7, D0–D7 and E0–E7 from the fullness level value storage unit 30 in response to the select signal SEL0–SEL4 and outputs the selected bit value as a corresponding bit value of the signal MQ0–MQ7 to the signal comparator 50.

The first selection means 41 includes NAND gates 411–415 for NANDing first bit values A0–E0 of the fullness level values A0–A7, B0–B7, C0–C7, D0–D7 and E0–E7 from the fullness level value storage unit 30 and bit values of the select signal SEL0–SEL4, respectively, and a NAND gate 416 for NANDing output signals from the NAND gates 411–415 and outputting the resultant signal as a first bit value MQ0 of the signal MQ0–MQ7 to the signal comparator 50.

Each of the second to eighth selection means 41–48 has the same construction as that of the first selection means 41 and a description thereof will thus be omitted.

Figure 7:
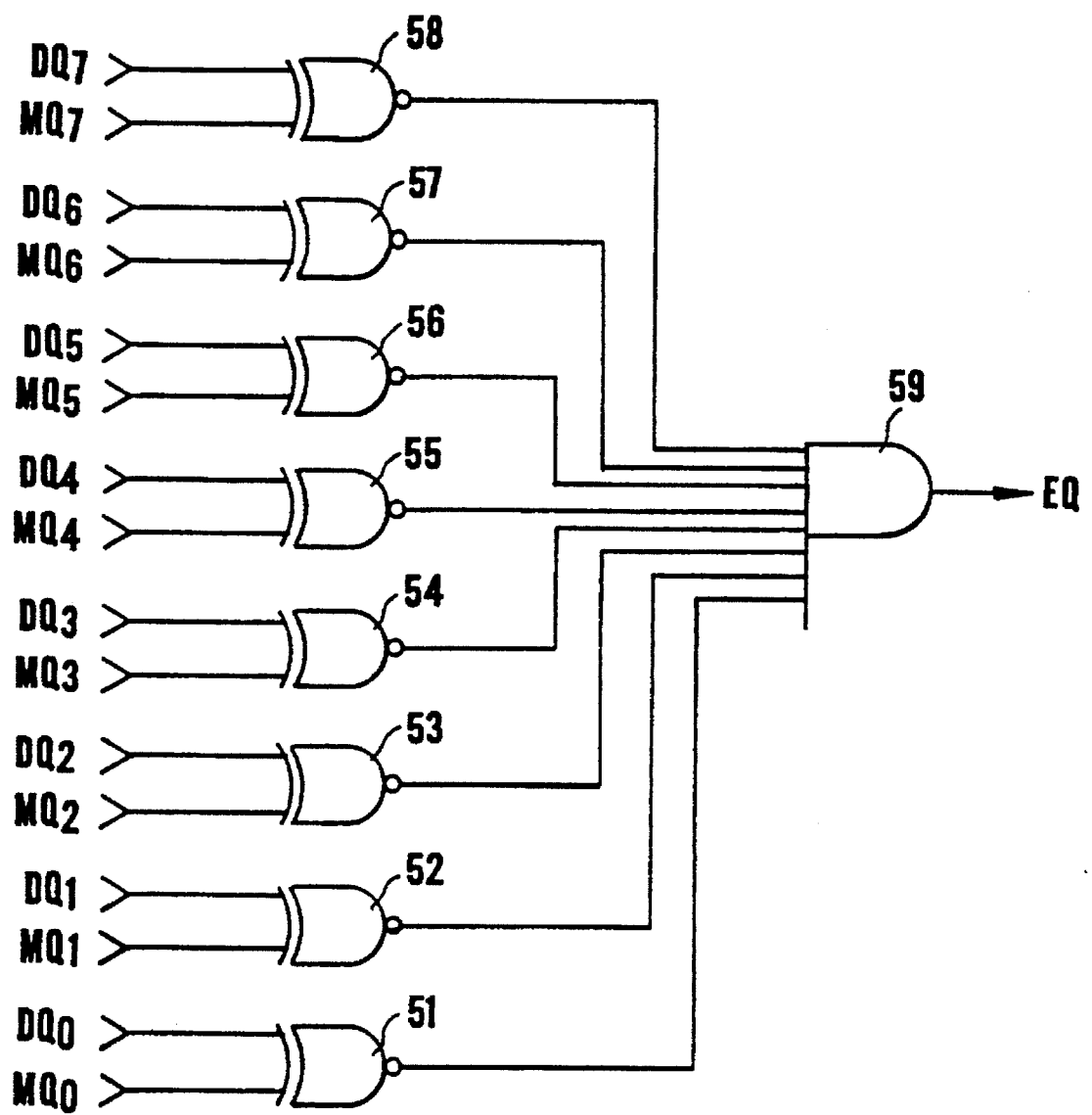
FIG. 7 is a detailed circuit diagram of a signal comparator in FIG. 2.

Referring to FIG. 7, there is shown a detailed circuit diagram of the signal comparator 50 in FIG. 2. As shown in this drawing, the signal comparator 50 includes exclusive NOR gates 51–58 for exclusive-NORing the bit values of the count signal DQ0–DQ7 from the clock counting circuit 20 and the bit values of the output signal MQ0–MQ7 from the multiplexer 40, respectively, and an AND gate 59 for ANDing output signals from the exclusive NOR gates 51–58 and outputting the resultant signal EQ to the demultiplexer 60.

Figure 8:
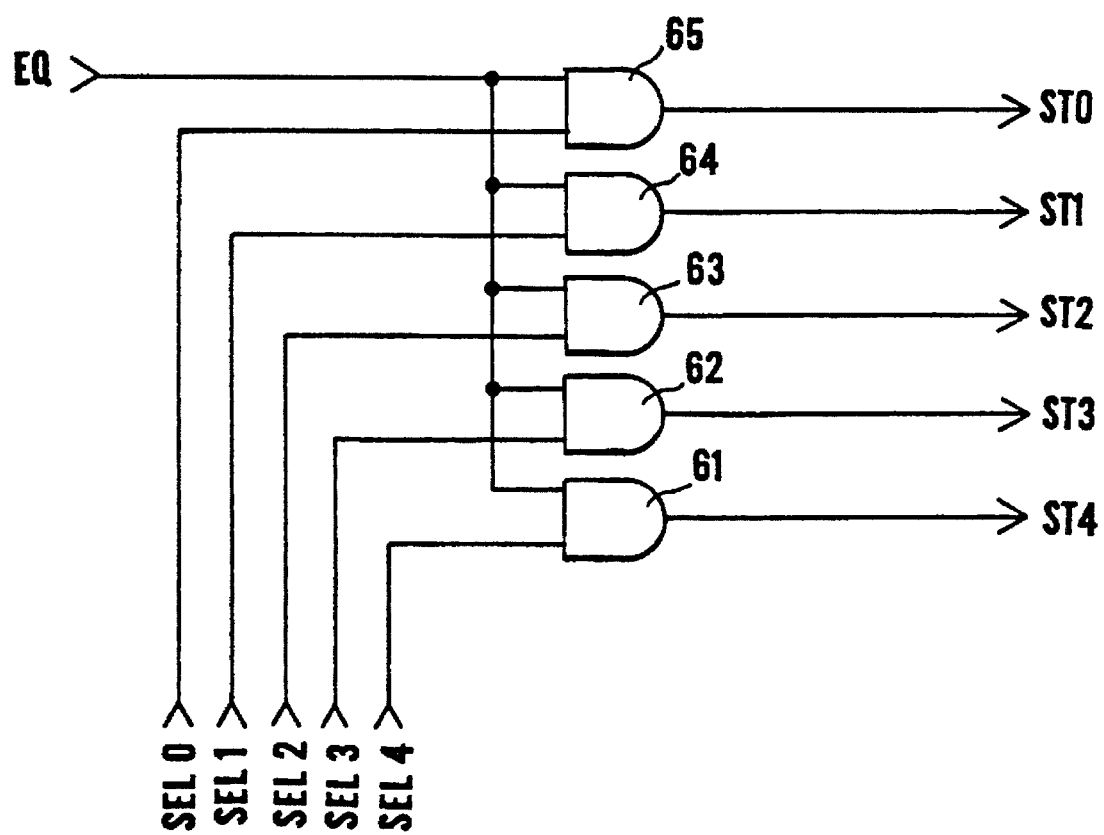
FIG. 8 is a detailed circuit diagram of a demultiplexer in FIG. 2.

Referring to FIG. 8, there is shown a detailed circuit diagram of the demultiplexer 60 in FIG. 2. As shown in this drawing, the demultiplexer 60 includes AND gates 61–65, each of which ANDs a corresponding bit value of the select signal SEL0–SEL4 and the output signal EQ from the signal comparator 50 and outputs the resultant signal as a corresponding one of the status signals ST0–ST4 to the flag generator 70.

Figure 9:
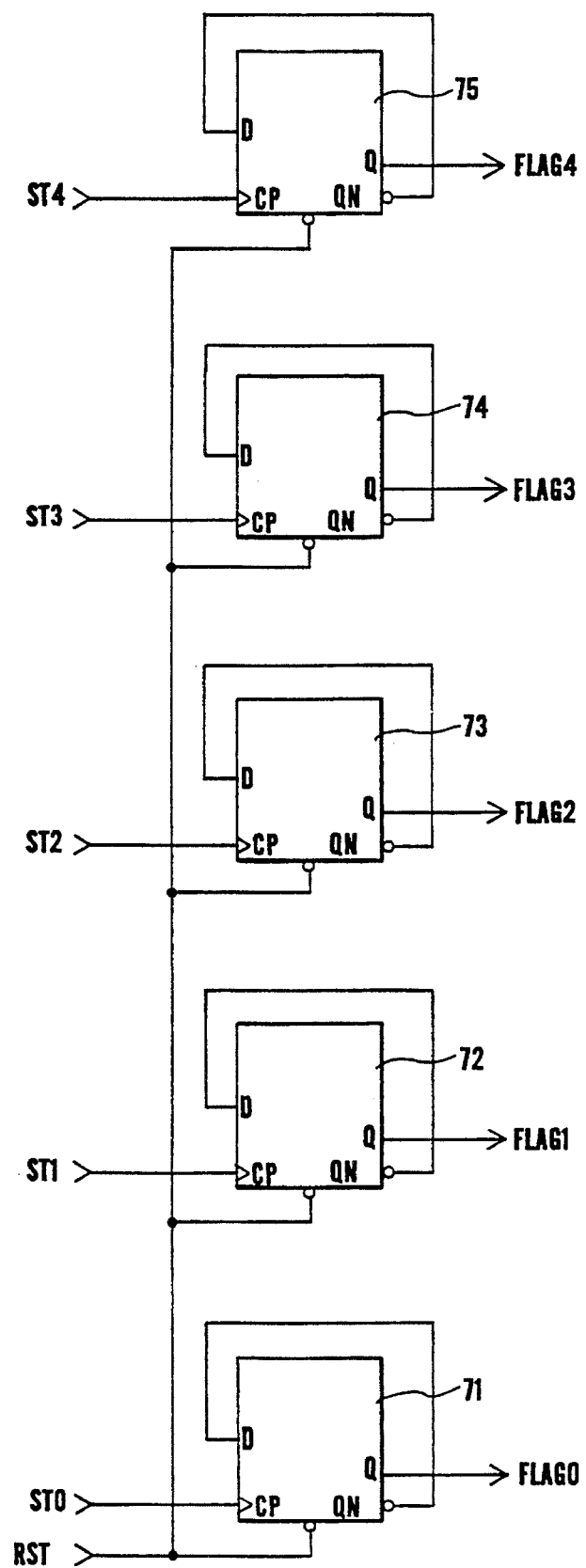
FIG. 9 is a detailed circuit diagram of a flag generator in FIG. 2.

Referring to FIG. 9, there is shown a detailed circuit diagram of the flag generator 70 in FIG. 2. As shown in this drawing, the flag generator 70 includes D flip-flops 71–75, each of which is reset in response to the reset signal RST, latches its inverted output signal QN inputted at its input terminal D in response to a corresponding one of the status signals ST0–ST4 from the demultiplexer 60 inputted at its clock terminal CP and outputs the latched signal as a corresponding one of the flag signals FLAG0–FLAG4.

The operation of the data input/output state detection apparatus with the above-mentioned construction in accordance with the present invention will hereinafter be described in detail.

At an initial state of the FIFO memory, the load clock signal LDCLK, the load enable signal LDEN and the reset signal RST are high in logic, whereas the read clock signal RCLK and the write clock signal WCLK are low in logic. In the control signal generator 10, the OR gate 11 ORes the high load clock signal LDCLK, the low read clock signal RCLK and the low write clock signal WCLK and thus outputs the high clock signal CLK to the clock counting circuit 20. The inverter 12 inverts the low read clock signal RCLK and outputs the resultant high logic signal to the set terminal SN of the S-R latch 14. The NOR gate 13 NORes the high reset signal RST and the low write clock signal WCLK and outputs the resultant low logic signal to the reset terminal RN of the S-R latch 14. As a result, the mode signal MOD from the S-R latch 14 goes low in logic as shown in the truth table of FIG. 3B. Then, the low mode signal MOD from the S-R latch 14 is applied to the clock counting circuit 20.

Noticeably, at the initial state of the FIFO memory, the high load enable signal LDEN is applied to the clock counting circuit 20 and the high load clock signal LDCLK is applied to the control signal generator 10. On the contrary, if the present state of the FIFO memory is not the initial state, both the load enable signal LDEN and the load clock signal LDCLK are low in logic.

The clock counting circuit 20 inputs the high reset signal RST, the low mode signal MOD and the high clock signal CLK from the control signal generator 10, the high load enable signal LDEN and the initial value INIT0–INIT7.

The initial value INIT0–INIT7 is supplied to the clock counting circuit 20 and the fullness level value storage unit 30. Noticeably, in the case where the present apparatus is applied to the plurality of FIFO memories, the initial value INIT0–INIT7 supplied to the clock counting circuit 20 signifies the count signal DQ0–DQ7 previously outputted from the clock counting circuit 20. Also, the initial value INIT0–INIT7 supplied to the fullness level value storage unit 30 signifies the fullness level value.

In the clock counting stages 21–28 of the clock counting circuit 20, as shown in FIG. 4, the count signal bit values DQ0–DQ7 from the D flip-flops 213 and 224–284 are cleared by the reset signal RST.

Each of the selectors 221–281 outputs the input signal at its one input terminal I0 to the corresponding one of the exclusive OR gates 222–282 if the mode signal MOD from the control signal generator 10 is low in logic, whereas the input signal at its other input terminal I1 to the corresponding exclusive OR gate if the mode signal MOD is high in logic.

When the load enable signal LDEN is high in logic, each of the selectors 212 and 223–283 selects the corresponding bit value of the initial value INIT0–INIT7 and outputs the selected bit value to the corresponding one of the D flip-flops 213 and 224–284. As a result, the D flip-flops 213 and 224–284 output the corresponding bit values of the initial value INIT0–INIT7 to the signal comparator 50, respectively.

By the way, the clock counting circuit 20 is adapted to count the clock signal CLK from the control signal generator 10 in response to the mode signal MOD therefrom. If the mode signal MOD from the control signal generator 10 is low in logic, the clock counting circuit 20 acts as an up counter in a write mode. On the contrary, if the mode signal MOD from the control signal generator 10 is high in logic, the clock counting circuit 20 acts as a down counter in a read mode.

After the initializing operation is performed in the above-mentioned manner, the clock counting circuit 20 acts automatically as the up counter in response to the low mode signal MOD from the control signal generator 10.

In this case, in the control signal generator 10, upon inputting the high write clock signal WCLK, the OR gate 11 outputs the high clock signal CLK to the clock counting circuit 20. The inverter 12 inverts the low read clock signal RCLK and outputs the resultant high logic signal to the set terminal SN of the S-R latch 14. The NOR gate 13 NORes the low reset signal RST and the high write clock signal WCLK and outputs the resultant low logic signal to the reset terminal RN of the S-R latch 14. As a result, the S-R latch 14 outputs the low mode signal MOD to the clock counting circuit 20.

It is assumed that the initial value INIT0–INIT7 supplied to the clock counting circuit 20 is "0". In the first counting stage 21 of the clock counting circuit 20, the selector 212 selects the first count signal bit value DQ0 inverted by the inverter 211 in response to the low load enable signal LDEN. Then, the D flip-flop 213 latches the output signal from the selector 212 at a rising edge of the clock signal CLK from the control signal generator 10. As a result, the first count signal bit value DQ0 from the D flip-flop 213 is "1" in logic. Each of the second to eighth counting stages 22–28 exclusive-ORes its low output signal and the output signal from the previous stage and latches the resultant signal. As a result, the second to eighth count signal bit values DQ1–DQ7 from the second to eighth counting stages 22–28 remain at "0" in logic.

Thereafter, when the high write clock signal WCLK is applied to the control signal generator 10 once more again, the first count signal bit value DQ0 of logic "1" is inverted by the inverter 211 in the first counting stage 21. Then in the first counting stage 21, the D flip-flop 213 latches the low logic signal from the selector 212. As a result, the first count signal bit value DQ0 from the D flip-flop 213 goes "0" in logic. In the second counting stage 22, the D flip-flop 224 latches the high logic signal from the selector 223. As a result, the second count signal bit value DQ1 from the D flip-flop 224 goes "1" in logic. Similarly, the third to eighth count signal bit values DQ2–DQ7 from the third to eighth counting stages 23–28 remain at "0" in logic.

Thereafter, when the high write clock signal WCLK is applied to the control signal generator 10 once more again, the first count signal bit value DQ0 of logic "0" is inverted by the inverter 211 in the first counting stage 21. Then in the first counting stage 21, the D flip-flop 213 latches the high logic signal from the selector 212. As a result, the first count signal bit value DQ0 from the D flip-flop 213 goes "1" in logic. The second counting stage 22 exclusive-ORes its output DQ1 of logic "1" and the previous output DQ0 of logic "0" from the first counting stage 21. The resultant high logic signal is latched by the D flip-flop 224. As a result, the second count signal bit value DQ1 from the D flip-flop 224 remains at "1" in logic. Similarly, the third to eighth count signal bit values DQ2–DQ7 from the third to eighth counting stages 23–28 remain at "0" in logic.

In result, the output DQ0 of the first counting stage 21 is inverted whenever the clock signal CLK from the control signal generator 10 is inputted. The output DQ1 of the second counting stage 22 is inverted whenever the clock signal CLK from the control signal generator 10 is inputted two times. The output DQ2 of the third counting stage 23 is inverted whenever the clock signal CLK from the control signal generator 10 is inputted four times. Also, the outputs DQ3–DQ7 from the fourth to eighth counting stages 24–28 are inverted whenever the clock signal CLK from the control signal generator 10 is inputted 8, 16, 32, 64 and 128 times, respectively.

Namely, in the up counting mode, the clock counting circuit 20 increases the binary number sequentially whenever the clock signal CLK from the control signal generator 10 is inputted, to indicate the number of data stored in the FIFO memory.

On the other hand, in the down counting mode, the clock counting circuit 20 is operated in the opposite manner to that of the up counting mode. Namely, the clock counting circuit 20 reduces the binary number sequentially whenever the clock signal CLK from the control signal generator 10 is inputted, to indicate the number of data stored in the FIFO memory.

The fullness level value storage unit 30 is adapted to store the initial value INIT0–INIT7 in response to the load signal LOAD0–LOAD4 and output the fullness level values A0–A7, B0–B7, C0–C7, D0–D7 and E0–E7 (for example, 8, 64, 128, 192 and 248). In the first register 31 of the fullness level value storage unit 30, the D flip-flops 311–318 input the first bit value LOAD0 of the load signal LOAD0–LOAD4 at their clock terminals CP and the corresponding bit values of the initial value INIT0–INIT7 at their input terminals D and output the corresponding bit values of the fullness level value A0–A7 to the multiplexer 40, respectively.

In the same manner as that of the first register 31, each of the second to fifth registers 32–35 latches the initial value INIT0–INIT7 in response to the corresponding bit value of the load signal LOAD0–LOAD4 and outputs the latched value as the corresponding fullness level value to the multiplexer 40.

Namely, at the initial state of the FIFO memory, the first to fifth registers 21–25 in the fullness level value storage unit 30 store the initial value INIT0–INIT7 using the bit values of the load signal LOAD0–LOAD4 as individual clocks and output the five fullness level values A0–A7, B0–B7, C0–C7, D0–D7 and E0–E7 (for example, 8, 64, 128, 192 and 248) to the multiplexer 40, respectively.

In the multiplexer 40, the NAND gates 411–415 of the first selection means 41 NAND the output bit values A0, B0, C0, D0 and E0 from the fullness level value storage unit 30 and the select signal bit values SEL0–SEL4, respectively. Then in the first selection means 41, the NAND gate 416 NANDs the output signals from the NAND gates 411–415. The second to eighth selection means 42–48 logically combine the output bit values from the fullness level value storage unit 30 and the select signal bit values SEL0–SEL4 in the same manner as that of the first selection means 41. As a result, the multiplexer 40 outputs one of the fullness level values A0–A7, B0–B7, C0–C7, D0–D7 and E0–E7 from the fullness level value storage unit 30 corresponding to a high logic one of the select signal bit values SEL0–SEL4 to the signal comparator 50.

For example, if the select signal bit SEL0 is "1" in logic, the remaining select signal bits SEL1–SEL4 are all "0" in logic. As a result, the multiplexer 40 outputs the first fullness level value A0–A7 from the fullness level value storage unit 30 to the signal comparator 50. Noticeably, the five select signal bits SEL0–SEL4 must not be overlapped and may be transferred by an external hardware or program.

Then, in the signal comparator 50, the exclusive NOR gates 51–58 exclusive-NOR the bit values of the count signal DQ0–DQ7 from the clock counting circuit 20 and the bit values of the output signal MQ0–MQ7 from the multiplexer 40, respectively. The AND gate 59 ANDs the output signals from the exclusive NOR gates 51–58 and outputs the resultant comparison signal EQ to the demultiplexer 60. The comparison signal EQ from the signal comparator 50 is "1" in logic if the count signal DQ0–DQ7 from the clock counting circuit 20 is the same as the output signal MQ0–MQ7 from the multiplexer 40, whereas "0" in logic if not so.

The AND gates 61–65 of the demultiplexer 60 AND the select signal bit values SEL0–SEL4 and the output signal EQ from the signal comparator 50 and output the status signals ST0–ST4 to the flag generator 70, respectively. The status signals ST0–ST4 from the demultiplexer 60 indicate the fullness level value regarding the number of data currently stored in the FIFO memory. Then, in the flag generator 70, the D flip-flops 71–75 latch their inverted output signals QN in response to the status signals ST0–ST4 from the demultiplexer 60 and output the latched signals as the flag signals FLAG0–FLAG4, respectively. One of the flag signals FLAG0–FLAG4 is inverted in level when the corresponding one of the status signals ST0–ST4 from the demultiplexer 60 is made active "1", to indicate the current state of the FIFO memory.

The operation of the data input/output state detection apparatus of the present invention will hereinafter be described in more detail with respect to the write mode, as an example.

First, it is assumed that, at the initial state, the first to fifth 8-bit registers 31–35 in the fullness level value storage unit 30 store the fullness level values A0–A7, B0–B7, C0–C7, D0–D7 and E0–E7 of 8, 64, 128, 192 and 248, respectively, the output signal DQ0–DQ7 from the clock counting circuit 20 is cleared to "0", and the first bit value of the select signal SEL0–SEL4 is "1" in logic and the remaining bit values are all "0" in logic.

At this time, in the case where the output value DQ0–DQ7 from the clock counting circuit 20 is "0" or the maximum, the FIFO memory is empty or full.

Then, as the write clock signal WCLK is supplied, the clock counting circuit 20 acts as the up counter. At this time, the clock counting circuit 20 provides the output value DQ0–DQ7 of "1" because only the output DQ0 of the first counting stage 21 thereof goes high in logic. Thereafter, when the write clock signal WCLK is further supplied 6 times, the clock counting circuit 20 provides the output value DQ0–DQ7 of "7" because the outputs DQ0–DQ2 of the first to third counting stages 21–23 thereof go high in logic.

The multiplexer 40 selects the output value A0–A7 from the fullness level value storage unit 30 in response to the high logic select signal bit SEL0 and thus provides the output value MQ0–MQ7 of "8". The comparator 50 compares the output value DQ0–DQ7 of "7" from the clock counting circuit 20 with the output value MQ0–MQ7 of "8" from the multiplexer 40. The comparison signal EQ from the signal comparator 50 goes low in logic because the output value DQ0–DQ7 of "7" from the clock counting circuit 20 is not in accord with the output value MQ0–MQ7 of "8" from the multiplexer 40. As a result, the flag generator 70 remains at its initial state in response to the low comparison signal EQ from the signal comparator 50.

Thereafter, when the write clock signal WCLK is supplied once more again, the output value DQ0–DQ7 from the clock counting circuit 20 becomes "8", thereby causing the comparison signal EQ from the signal comparator 50 to go high in logic. The status signal ST0 from the demultiplexer 60 becomes high in logic because the comparison signal EQ from the signal comparator 50 and the select signal bit SEL0 are high in logic. In response to the high status signal ST0 from the demultiplexer 60, the flag signal FLAG0 from the flag generator 70 is inverted from low to high in logic to indicate the data storage state of the FIFO memory. As the flag signal FLAG0 from the flag generator 70 is varied in logic, the second select signal bit SEL1 goes high in logic and the first select signal bit SEL0 goes low in logic. Also, the select signal bits SEL2–SEL4 remain at their low states.

The above operation is repeatedly performed as the write clock signal WCLK is continuously supplied. At that time the output value DQ0–DQ7 from the clock counting circuit 20 becomes "64", the comparison signal EQ from the signal comparator 50 goes high in logic. As a result, the flag signal FLAG1 from the flag generator 70 is inverted from low to high in logic.

In other words, with the above operation repeatedly performed, the select signal bits SEL0–SEL4 become sequentially "1" in logic, the clock counting circuit 20 counts the clock signal CLK based on the write mode, the signal comparator 50 compares the output value DQ0–DQ7 from the clock counting circuit 20 with the output value MQ0–MQ7 from the multiplexer 40, and the flag signals FLAG0–FLAG4 from the flag generator 70 are sequentially inverted in logic whenever the output value DQ0–DQ7 from the clock counting circuit 20 is in accord with the output value MQ0–MQ7 from the multiplexer 40, so as to indicate the data storage state of the FIFO memory.

On the other hand, in the case where the write clock signal WCLK is not supplied but the read clock signal RCLK is supplied when the output value DQ0–DQ7 from the clock counting circuit 20 becomes "65" after "64", the clock counting circuit 20 acts as the down counter in response to the high mode signal MOD from the control signal generator 10.

In this case, the output value MQ0–MQ7 from the multiplexer 40 becomes "64" under the control of the select signal SEL0–SEL4. As a result, when the output value DQ0–DQ7 from the clock counting circuit 20 becomes "64" because of the down counting operation, the comparison signal EQ from the signal comparator 50 goes high in logic, thereby causing the flag signal FLAG1 from the flag generator 70 to be inverted from high to low in logic. Then, the output value MQ0–MQ7 from the multiplexer 40 becomes "8" under the control of the select signal SEL0–SEL4.

Subsequently, the input of the read clock signal RCLK is again counted, the data storage state of the FIFO memory is discriminated in accordance with the counted result, and the discriminated result is indicated by the flag signal FLAG0.

The select signal bit values SEL0–SEL4 may be adjusted according to the operating mode of the clock counting circuit 20 and the values of the flag signals FLAG0–FLAG4 from the flag generator 70 by an external hardware or program.

In accordance with an alternative embodiment of the present invention, the clock counting circuit 20 may be substituted with a subtracter connected to up and down counters. The up counter counts the write clock signal WCLK and the down counter counts the read clock signal RCLK. A difference between count values from the up and down counters is discriminated and the data storage state of the FIFO memory is indicated in accordance with the discriminated result.

As apparent from the above description, according to the present invention, the data input/output state detection apparatus can become more simple in the circuit construction with the use of the single comparator. Also, the use of the single comparator has the effect of coping readily with a size of the FIFO memory and a variation in the fullness level values. Further, the data input/output state detection apparatus of the present invention may alternately be applied to the plurality of FIFO memories because it comprises the counter using the number of data stored in the corresponding FIFO memory as the initial value. Moreover, the fullness level values can be adjusted any time according to the application range because they are stored as the initial values in the registers. Furthermore, the use of no delay for the clock generation and the storage of the status values have the effect of preventing a timing error from being generated according to a manufacturing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting data input/output states of a plurality of first-in first-out memories, comprising:

control signal generation means for logically combining a load clock signal, a read clock signal, a write clock signal and a reset signal to generate a clock signal and a mode signal;

clock counting means for performing a counting operation for the read clock signal and the write clock signal in response to the clock signal and the mode signal from said control signal generation means to generate a count signal indicative of the number of data currently stored in a corresponding one of the first-in first-out memories;

fullness level value storage means for storing a plurality of fullness level values, each of the fullness level values being indicative of the number of data storable at the maximum in a corresponding one of a plurality of levels of the corresponding first-in first-out memory;

multiplexing means for selecting one of the fullness level values from said fullness level value storage means in response to a select signal;

signal comparison means for comparing an output signal from said multiplexing means with the count signal from said clock counting means to discriminate whether it is the same as the count signal;

demultiplexing means for generating a plurality of status signals in response to an output signal from said signal comparison means and the select signal, the status signals being indicative of a fullness level value regarding the number of data currently stored in the corresponding first-in first-out memory; and flag generation means for generating a plurality of flag signals in response to the status signals from said demultiplexing means.

2. An apparatus for detecting data input/output states of a plurality of first-in first-out memories, as set forth in claim 1, wherein said control signal generation means includes:

an OR gate for ORing the load clock signal, the read clock signal and the write clock signal and outputting the resultant signal as the clock signal to said clock counting means;

an inverter for inverting the read clock signal;

a NOR gate for NORing the reset signal and the write clock signal; and an S-R latch for outputting the mode signal to said clock counting means in response to an output signal from said inverter and an output signal from said NOR gate.

3. An apparatus for detecting data input/output states of a plurality of first-in first-out memories, as set forth in claim 1, wherein said clock counting means includes a plurality of counting stages for inputting an initial value in response to a load enable signal and performing an up counting operation for the write clock signal if the mode signal from said control signal generation means is low in logic, whereas a down counting operation for the read clock signal if the mode signal from said control signal generation means is high in logic, each of said plurality of counting stages logically combining its previous output value and an output value from the previous stage to increase or reduce a corresponding bit value of the count signal.

4. An apparatus for detecting data input/output states of a plurality of first-in first-out memories, as set forth in claim 3, wherein a first one of said plurality of counting stages includes:

an inverter for inverting a first bit value of the count signal;

a selector for selecting one of an output signal from said inverter and a first bit value of the initial value in response to the load enable signal; and a flip-flop for latching an output signal from said selector in response to the clock signal from said control signal generation means and outputting the latched signal as the first bit value of the count signal to a second one of said plurality of counting stages and said signal comparison means.

5. An apparatus for detecting data input/output states of a plurality of first-in first-out memories, as set forth in claim 3, wherein a second one of said plurality of counting stages includes:

a first selector for selecting one of a first bit value of the count signal from a first one of said plurality of counting stages and an inverted one of the first count signal bit value from said first counting stage in response to the mode signal from said control signal generation means;

an exclusive OR gate for exclusive-ORing an output signal from said first selector and a second bit value of the count signal;

a second selector for selecting one of an output signal from said exclusive OR gate and a second bit value of the initial value in response to the load enable signal;

a flip-flop for latching an output signal from said second selector in response to the clock signal from said control signal generation means and outputting the latched signal as the second bit value of the count signal to said signal comparison means;

a first AND gate for ANDing the second count signal bit value from said flip-flop and the first count signal bit value from said first counting stage and outputting the resultant signal to a third one of said plurality of counting stages; and a second AND gate for ANDing an inverted one of the second count signal bit value from said flip-flop and the inverted one of the first count signal bit value from said first counting stage and outputting the resultant signal to said third counting stage;

wherein a last one of said plurality of counting stages is substantially the same in construction as said second counting stage, with the except that said first and second AND gates are removed; and wherein each of the remaining ones of said plurality of counting stages has the same construction as that of said second counting stage.

6. An apparatus for detecting data input/output states of a plurality of first-in first-out memories, as set forth in claim 1, wherein said fullness level value storage means includes a plurality of registers for storing an initial value in response to a load signal and outputting the corresponding fullness level values to said multiplexing means, respectively.

7. An apparatus for detecting data input/output states of a plurality of first-in first-out memories, as set forth in claim 6, wherein a first one of said plurality of registers includes a plurality of flip-flops, each of said plurality of flip-flops latching a corresponding bit value of the initial value in response to a first bit value of the load signal and outputting the latched value as a corresponding bit value of the corresponding fullness level value to said multiplexing means; and wherein the remaining ones of said plurality of registers are the same in construction as said first register to latch the initial value in response to the remaining bit values of the load signal and output the latched values as the corresponding fullness level values to said multiplexing means, respectively.

8. An apparatus for detecting data input/output states of a plurality of first-in first-out memories, as set forth in claim 1, wherein said multiplexing means includes a plurality of selection means, each of said plurality of selection means selecting one of corresponding bit values of the fullness level values from said fullness level value storage means in response to the select signal and outputting the selected bit value as a corresponding bit value of the output signal from said multiplexing means to said signal comparison means.

9. An apparatus for detecting data input/output states of a plurality of first-in first-out memories, as set forth in claim 8, wherein a first one of said plurality of selection means includes:

a plurality of NAND gates for NANDing first bit values of the fullness level values from said fullness level value storage means and a plurality of bit values of the select signal, respectively; and a NAND gate for NANDing output signals from said plurality of NAND gates and outputting the resultant signal as a first bit value of the output signal from said multiplexing means to said signal comparison means; and wherein the remaining ones of said plurality of selection means are the same in construction as said first selection means to select the corresponding bit values of the fullness level values from said fullness level value storage means in response to the bit values of the select signal.

10. An apparatus for detecting data input/output states of a plurality of first-in first-out memories, as set forth in claim 1, wherein said signal comparison means includes:

a plurality of exclusive NOR gates for exclusive-NORing a plurality of bit values of the count signal from said clock counting means and a plurality of bit values of the output signal from said multiplexing means, respectively; and an AND gate for ANDing output signals from said plurality of exclusive NOR gates and outputting the resultant signal to said demultiplexing means.

11. An apparatus for detecting data input/output states of a plurality of first-in first-out memories, as set forth in claim 1, wherein said demultiplexing means includes a plurality of AND gates for ANDing a plurality of bit values of the select signal and the output signal from said signal comparison means and outputting the resultant signals as the status signals to said flag generation means, respectively.

12. An apparatus for detecting data input/output states of a plurality of first-in first-out memories, as set forth in claim 1, wherein said flag generation means includes a plurality of flip-flops for latching their inverted output signals in response to the status signals from said demultiplexing means and outputting the latched signals as the flag signals, respectively.

* * * * *